United States Patent [19]

Hebrank

[11] Patent Number: 4,681,063
[45] Date of Patent: Jul. 21, 1987

[54] HIGH SPEED AUTOMATED INJECTION SYSTEM FOR AVIAN EMBRYOS

[75] Inventor: John H. Hebrank, Durham, N.C.

[73] Assignee: Embrex Inc., Raleigh, N.C.

[21] Appl. No.: 881,121

[22] Filed: Jul. 2, 1986

[51] Int. Cl.[4] .............................................. B65G 59/04
[52] U.S. Cl. ........................................ 119/1; 294/65; 435/284; 435/292
[58] Field of Search ................... 119/1; 604/152, 156, 604/198; 294/65; 435/284, 292

[56] References Cited

U.S. PATENT DOCUMENTS

| | | |
|---|---|---|
| 2,477,752 | 8/1949 | Kiss . |
| 3,037,479 | 6/1962 | Flory . |
| 3,077,993 | 2/1963 | Mulvany et al. .................. 294/65 X |
| 3,123,045 | 3/1964 | Cosgrove et al. . |
| 3,139,300 | 6/1964 | Hirt ........................................ 294/65 |
| 3,256,856 | 6/1966 | Nicely et al. . |
| 3,377,989 | 4/1968 | Sandhage et al. . |
| 3,420,743 | 1/1969 | Sandhage et al. .............. 435/284 X |
| 3,506,140 | 4/1970 | Koch et al. ........................ 294/65 X |
| 3,594,285 | 7/1971 | Noren .................................. 435/293 |
| 3,606,960 | 9/1971 | Butterworth ...................... 294/65 X |
| 3,910,233 | 10/1975 | Amburn .................................. 119/1 |
| 3,991,174 | 11/1976 | Amburn .................................. 119/1 |
| 4,040,388 | 8/1977 | Miller . |
| 4,045,073 | 8/1977 | Mosterd ............................. 294/65 X |
| 4,355,936 | 10/1982 | Thomas et al. ................... 294/65 X |
| 4,444,423 | 4/1984 | Montferme et al. .............. 294/65 X |
| 4,469,047 | 9/1984 | Miller . |

Primary Examiner—Henry E. Raduazo
Assistant Examiner—Creighton Smith
Attorney, Agent, or Firm—Bell, Seltzer, Park & Gibson

[57] ABSTRACT

A high speed automated injection system for avian embryos is provided which can inject eggs with fluid substances while they are being transferred from setting trays to hatching trays. The device includes suction devices which lift eggs out of engagement with trays, rather than pushing them, before injecting them. By providing separate mechanisms and devices for first forming an opening in the egg shell and then injecting the avian embryo or the surrounding environment with a fluid substance, the device avoids the undesirable mechanical compromise of using a single needle or punch to both puncture the shell of an egg and deliver fluid substances to the interior of the egg.

27 Claims, 7 Drawing Figures

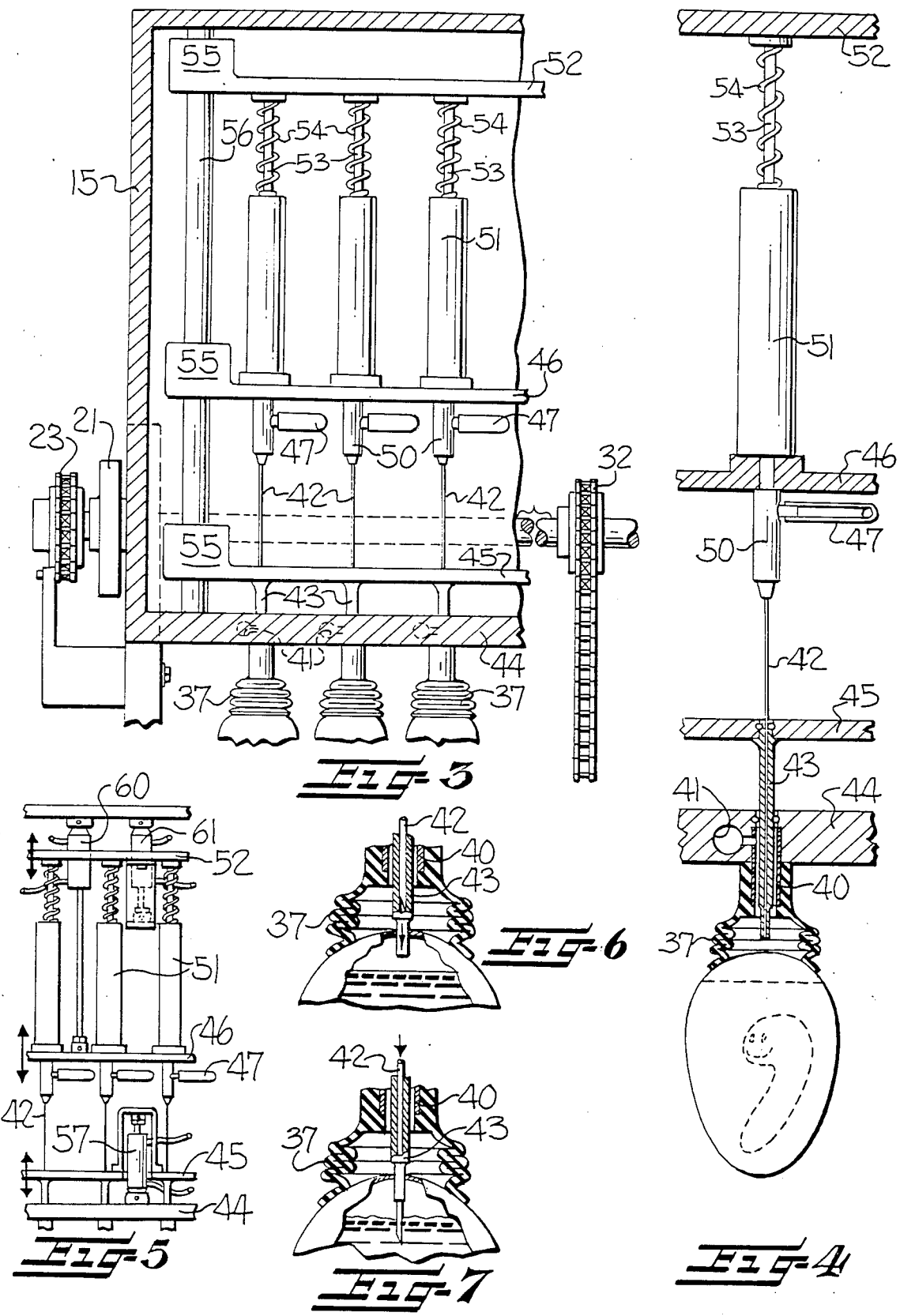

HIGH SPEED AUTOMATED INJECTION SYSTEM FOR AVIAN EMBRYOS

FIELD OF THE INVENTION

The present invention relates to the automatic injection of eggs with fluid substances.

BACKGROUND OF THE INVENTION

A number of reasons now exist in the fields of both medicine and poultry husbandry, among others, which call for the injection of various types of avian eggs with various substances for particular reasons. In the field of medicine, eggs have typically been used to incubate certain vaccines which have medical applications.

More recently, as the field of poultry embryology has become more advanced, it has been discovered that the addition of various substances to the embryo or to the environment around the embryo within an avian egg can have beneficial effects on the growth of the subsequently hatched chick, the prevention of disease in hatched chicks, the percentage hatch of large numbers of incubated eggs, and the physical characteristics of hatched poultry. Additionally, more recent studies indicate that certain types of vaccination which could heretofore only be carried out upon either recently hatched or fully mature poultry, can now be successfully accomplished while the chick is still embryonated.

Depending upon the purpose for which the egg is being treated, the location of injection will vary. For certain purposes, the substance to be injected into the egg needs to be delivered to the amniotic fluid near the small end of the egg, for other purposes the material needs to be delivered to the air sac end of the egg, and there may even arise occasions when a substance should be delivered to the embryo itself. Nevertheless, where eggs are being incubated to produce live poultry, care must be taken to avoid injuring the embryos during the injection and delivery of fluid substances. Individual eggs, however, can vary widely in size with accompanying associated differences in the distance between the shell and the location to which delivery of a fluid substance is desired. These differences can complicate the task of consistently supplying a desired substance to a particular location within each of a large number of eggs at a fast rate of speed.

One traditional method of injecting eggs is injection by hand. Although skilled operators can inject eggs by hand with some success, the speed and accuracy of the process is limited. Additionally, hand injection of eggs, even by skilled operators, cannot always guarantee the continuous repeated precision delivery of materials to a desired particular location within each egg. Presently, there exist no widely used or practical techniques or methodologies for high speed precision application of active substances into eggs.

Similarly, an alternative technique for treating poultry to obtain desired results has been hand injection of very young—typically day-old—chicks. As in the hand injection of eggs, speed and precision are limited. Furthermore, injection so soon after hatch places significant stress on the young chicks.

In addressing these problems, several automatic devices have been disclosed for injecting eggs. These include patents issued to Sandhage, U.S. Pat. No. 3,377,989, and to Miller, U.S. Pat. Nos. 4,040,388 and 4,469,047. Sandhage discloses a hand operated egg injection device for injecting a few eggs at the same time, but does not disclose any method or system for handling large numbers of eggs quickly and accurately. Miller '388 discloses an apparatus for injecting the smaller ends of eggs and resealing the holes produced, and Miller '047 shows a somewhat different device for injecting eggs from their larger, air sac ends. Both Miller patents disclose automated techniques, but apparently no actual devices based on the Miller disclosures have met with much market success, for whatever reasons.

Furthermore, none of these devices lift eggs of varying sizes by pulling them towards an injection device. Instead, all either push eggs toward an injection device or fail to move them at all. Given the relatively fragile nature of eggs, pushing them from one direction while puncturing them from the opposite direction can cause an economically significant increase in breakage rates.

Finally, all of these devices disclosed in these patents puncture eggs with the same instrument with which they deliver the fluid substances. Accordingly, various types of precise needles which may not be rigid enough to puncture an egg shell cannot be used in these devices. Alternatively, if such devices are equipped with needles large enough and rigid enough to puncture the eggshell, such needles may not provide the precise delivery of fluid—both as to location and amount—which more delicate needles can provide. Furthermore, the punching process will dull the beveled edge necessary for membrane penetration.

Accordingly, it is an object of this invention to provide an automatic egg injection machine which can simultaneously inject a plurality of eggs of varying sizes and deliver injected fluid substances to the same particular location with each egg, regardless of the size of the egg.

It is a further object of this invention to provide means for lifting a plurality of eggs from their upwardly facing ends rather than pushing them from the portions which rest on a tray or other holding device.

It is another object of this invention to provide a device and a method for automatically innoculating eggs with fluid substances while concurrently transferring the eggs from one position to another, such as from an incubation setting tray to a hatching tray.

It is a further object of this invention to provide a device which positions an egg and an injection needle in a fixed relationship with respect to one another in order to provide accurate and precise injection and delivery of fluid substances to a desired location within eggs of various sizes, regardless of the various sizes of the eggs.

Finally, it is an object of this invention to provide a device in which the functions of perforating the eggs and delivering fluid substances are carried out by two different tools or mechanisms so that each can be tailored to perform the intended task in the best possible manner.

SUMMARY OF THE INVENTION

The present invention addresses these objects by providing an innoculating device in which suction means simultaneously engage and lift a plurality of individual eggs from their respective upwardly facing portions and injects the eggs with the fluid substance while the eggs are engaged by the suction. At the same time, a preferred embodiment of the device automatically transfers eggs from an incubation setting tray to a hatching tray. Most importantly, the device precisely and accurately positions the delivery ends of its injection needles at consistent locations within each individual egg regardless of the size of the eggs.

The foregoing and other objects, advantages and features of the invention, and the manner in which the same are accomplished will become more readily apparent upon consideration of the following detailed description of the invention taken in conjunction with the accompanying drawings, which illustrate preferred and exemplary embodiments and wherein:

FIG. 3 is an enlarged cross-sectional view showing a portion of the injection head subassembly;

FIG. 4 is an enlarged, detailed partial cross-sectional view of one of the injectors of the present invention;

FIG. 5 is another partial sectional view of a portion of the suction and injection subassembly;

FIG. 6 is an enlarged view of the portion of the device which punctures an egg; and FIG. 7 is an enlarged view identical to FIG. 6 except showing an injection needle extended into the amniotic fluid of an egg.

DETAILED DESCRIPTION

Figure 1:
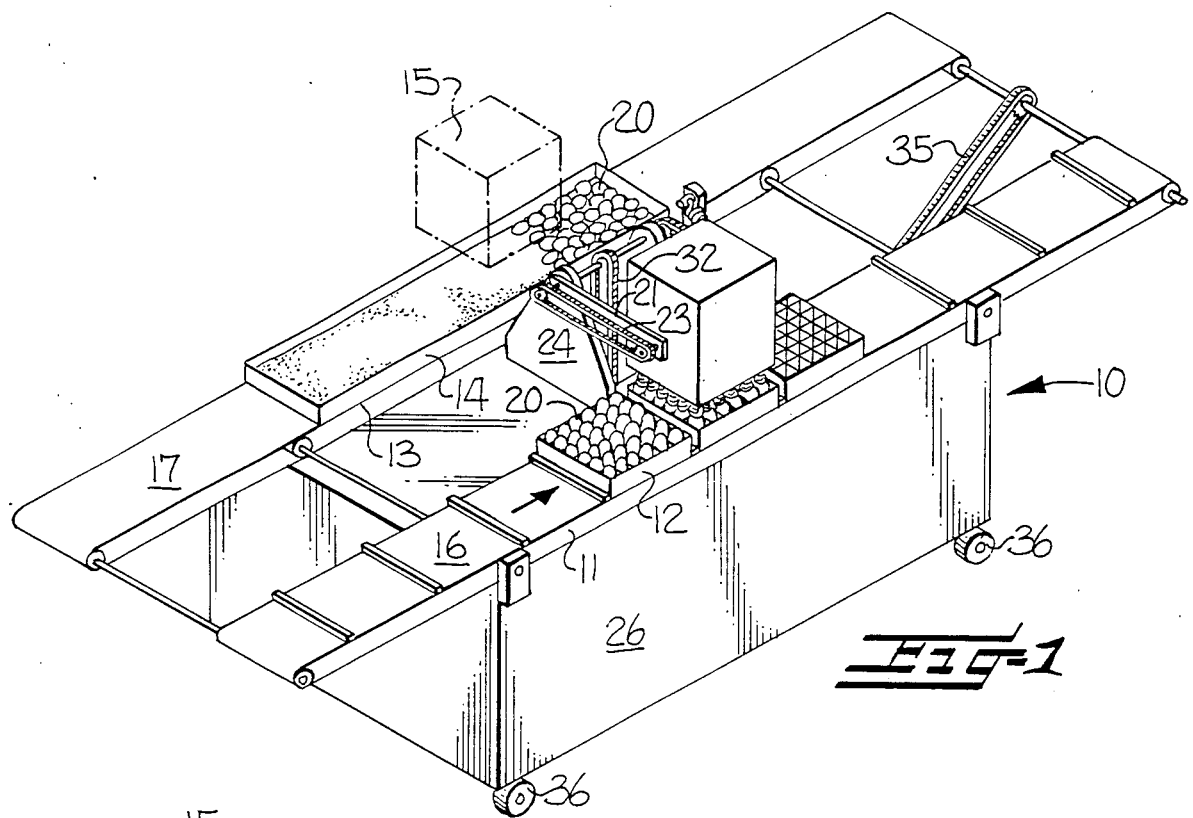
FIG. 1 is an overall perspective view of a preferred embodiment of the present invention.
Figure 2:
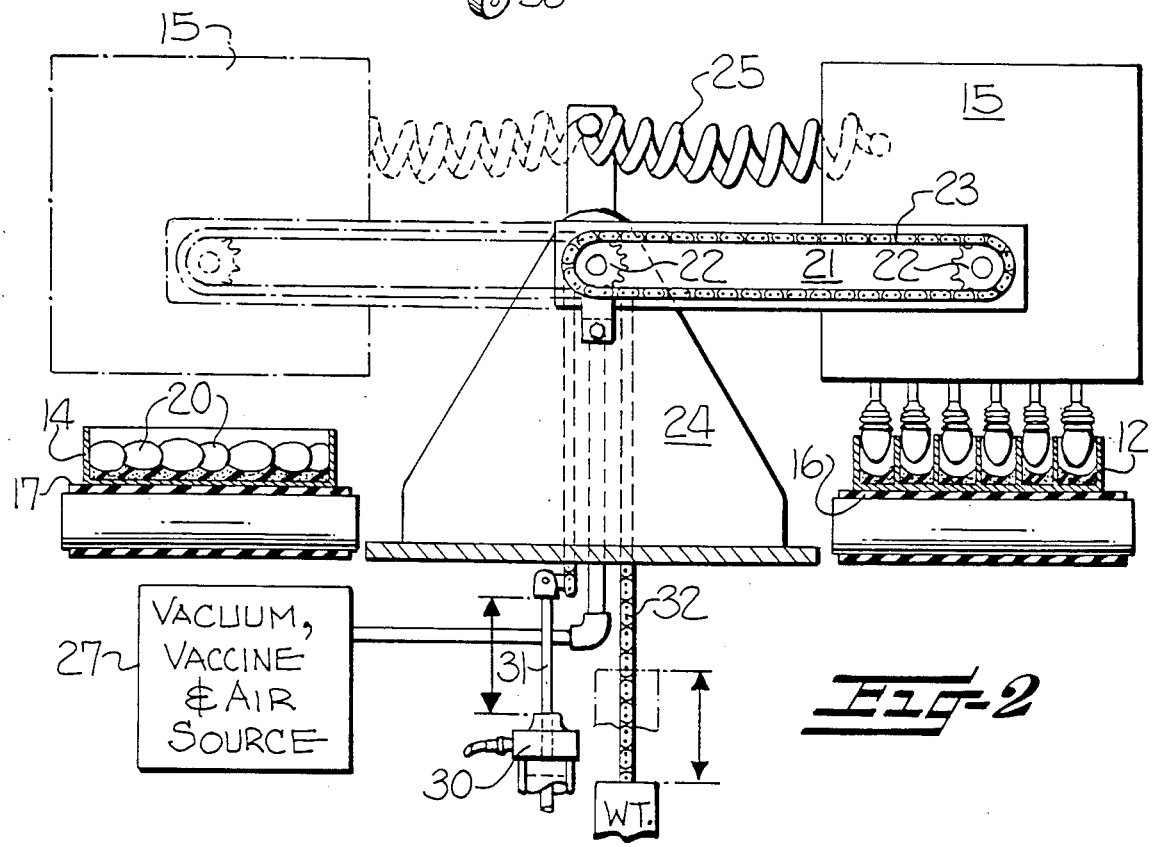
FIG. 2 is a side elevational view of the suction and injection assembly portions of the invention.

As illustrated in FIG. 1, a preferred embodiment of the invention is broadly designated at 10. As will be described herein, the device 10 broadly comprises suction means for simultaneously engaging and lifting a plurality of individual eggs from their respective upwardly facing portions and injection means which cooperate with the suction means to inject the eggs while they are engaged by the suction means.

As further shown by FIG. 1, the preferred embodiment of the device also transfers eggs from incubation setting trays to hatching trays while the injection of the eggs is taking place. As is known to those familiar with the incubation and hatching of eggs, incubated eggs are kept in an upright position in large trays which are slowly rocked back and forth in order to mimic the natural setting motion of a hen, which keeps the embryo floating freely in the amniotic fluid and prevents it from becoming attached to any one portion of the shell.

When eggs are ready to hatch, they must be allowed to rest in a position lying on their side, in which position the poultry chick can break the egg and emerge. Additionally, newly hatched chicks require a flat surface to walk on in order to avoid later problems with their legs. Accordingly, incubated eggs always must be transferred from setting trays which orient them in an upright position to hatching trays where they may rest freely in a generally horizontal orientation on a flat surface. As will be described more fully hereinafter, the present invention accomplishes this transfer automatically and in combination with injection. It will be understood by those familiar with this art that the transfer of eggs from setting trays to hatching trays during the injection process is not a necessary feature or limitation of the present invention, but is an advantageous feature that can be incorporated in the invention.

As seen broadly in FIG. 1, the illustrated embodiment of the device 10 includes a first rack 11 for receiving an incubation setting tray 12 containing eggs and a second rack 13 spaced apart from the first rack for receiving a hatching tray 14 thereon. In the embodiment illustrated, the suction and injection assembly is carried in a housing and broadly designated at 15. The housing and the assembly it carries is positioned between the first and second rack and mounted for movement between them. In the manner described earlier, the suction and injection assembly can simultaneously engage the upwardly facing portions of a plurality of individual eggs 20 at the first rack 11 and then hold the eggs by suction while carrying eggs to the second rack 13. As illustrated, the suction and injection assembly 15 can carry thirty-six eggs. The egg injection means described earlier inject the eggs with fluid substances while they are engaged and held by the suction so that incubated eggs in the setting tray 12 can be automatically removed from the setting tray, injected with a fluid substance, and then placed in the hatching tray 14, all without manual operation.

As used herein, the term "fluid" refers to any material which will flow, and is not limited to pure liquids. The term "fluid" can also refer to solutions, liquid-liquid suspensions, liquid-solid suspensions, gases, gaseous suspensions, emulsions, certain solid materials, and any other material or mixture of materials which exhibits fluid properties.

In the embodiment shown, the eggs 20 can be transferred from the setting tray 12 to a hatching tray 14 which carries a larger amount of eggs, typically 144. A conveyor belt 16 runs across the first rack 11, moves the setting trays under the suction and injection assembly 15, and stops them there while the eggs are being engaged. A similar conveyor belt 17 runs across the second rack 13 and moves the hatching trays under the assembly 15 and stops them there while the eggs are being released. In order to provide the necessary movement of the suction and injection assembly 15 between the first and second racks, there are provided injection assembly support arms 21, leveling sprockets 22, chain 23, a support plate 24, and an umbilical cord 25. The cord 25 can include the supply route for the fluid substance to be injected and the control means for the injection needles, and can also supply the vacuum suction to the flexible cups.

The base cabinet 26 can include the source of fluid substances, air and vacuum, shown schematically at 27, and a hydraulic cylinder 30 for moving the suction and injection assembly 15 by means of the arms 21 and the sprocket and chain 22 and 23, respectively. These are operatively connected to the cylinder 30 by the reciprocal arm 31, the weighted chain 32, sprocket 33, the shaft 34, and rack drive 35. In the device illustrated, portions of the racks 11 and 13 are foldable, and the entire device is mounted on wheels 36, making it portable.

As best shown in the singular view of FIG. 4, the suction means comprise a plurality of flexible cups 37, each of which is adapted for being received in seated, sealing relation against portions of the shell of an egg 20. A tube 40 is in communication with each of the flexible cups 37, preferably at upper portions thereof. Means are provided in communication with each of the tubes 40 for providing suction through the tube 40 to the cup 37, so that the suction seats the shell of an egg against the cup. In the illustrated embodiment, a vacuum channel 41 in communication with a suction source provides the suction to the tube 40.

The suction cups 37 also compress to a solid height so that when suction is applied from the vacuum channel 41 and through the tube 40 to the flexible cup 37, the cup engages the egg, and compresses to its solid height, and thereby fixes the position of the top of the egg with respect to the cup 37 and base plate 44.

As set forth earlier herein, because the injection device 10 lifts the eggs from their top portion, rather than pushing them from the bottom portions, the device 10 can lift eggs out of one type of tray and replace them in a second type of tray. Such action is impossible when using the previous devices because each of these devices either could not move eggs at all or always pushed the eggs from the bottom, usually by lifting the trays in which they were already positioned. Accordingly, because it lifts rather than pushes, the present invention can transfer eggs from place to place in addition to injecting them.

The injection operation of the invention is best illustrated in FIGS. 4, 6 and 7, which show a detailed view of the injection means. These include a plurality of needles 42 which have delivery ends 42a for supplying fluid substances therefrom. Adjacent each of the needles 42 are the punches 43 each of which forms an opening in the upwardly facing shell portions of each respective egg 20 while the device 10 holds the egg by suction. As seen in the drawings, each of the punches 43 surrounds one of the needles 42 so that after the punch 43 makes an opening in the shell of an egg, each respective injection needle can move through the respective opening of an egg shell to an injecting position. In this manner, the punch 43 can be selected to best form the required opening in the shell while the needle 42 can be selected to maximize the accuracy and precision of fluid delivery.

Furthermore, a sharp needle—typically bevelled—is a prerequisite for penetrating the egg's membrane. Therefore, the invention's provision of a separate punch and its consequent prevention of the needle's engagement with the egg shell preserves both the sharpness of the needle and its overall structural integrity and results in longer use of, and more consistent results from, each needle.

As further shown in FIG. 4, the injection needles 42 have their delivery ends 42a respectively disposed within each tube 40. The needles 42 are movable between a retracted inoperative position (FIG. 6) and an extended injecting position (FIG. 7) with respect to the tube 40, and therefore with respect to the cup 37 and the egg 20. As a result, the relationship defined by the seated position of the shell of an egg 20 against the cup 37 and the injecting position of the needle 42 reproducibly positions the needle at a predetermined location within the egg 20, regardless of its size.

As shown in some detail in FIGS. 3 and 4, in the illustrated embodiment the injection assembly is driven by a plurality of movable plates. A base plate 44 carries the suction channel 41, the tubes 40 and the cups 37. A punch drive plate 45 carries the punches 43 and moves them into perforating engagement with the eggs 20. The needles 42, are in turn driven by an injection drive plate 46.

In the embodiment shown, the substance which is to be injected into the egg 20 enters the system through the substance tube 47 and then moves into the valve portion 50 of a fluid pump 51. As illustrated in FIGS. 3 and 4, the fluid pump 51 is a syringe-type pump operated by the pump drive plate 52 which drives the syringe plunger 53. The pump 51 includes a plunger return spring 54 which recycles the plunger after the drive plate 52 returns.

The somewhat larger view of FIG. 3 shows all of these elements as well as the linear bearings 55 which support each of the respective drive plates during their respective up and down movement on support shafts 56, one of which is shown. FIG. 5 shows air cylinders 57, 60 and 61 which drive the punch drive plate 45, the injection drive plate 46 and the pump drive plate 52, respectively.

As will be understood by those familiar with the handling of eggs, the invention is compatible with a number of other procedures which are part of incubation and hatching of live poultry. For example, eggs may be examined prior to innoculation in order to detect infertile or broken ones. Possible techniques include light ("candling"), sound, or other diagnostic tools. The nature of the present invention provides for the incorporation of such techniques, especially given the conveying, lifting and transferring functions of the devices.

Because of all of these features, the invention also includes a method of simultaneously injecting a plurality of eggs of varying sizes with fluid substances, which method comprises applying suction to the upwardly facing shell portions of a plurality of individual eggs to engage and hold the eggs, lifting the eggs while the eggs are held by the suction and injecting the eggs with a fluid substance while the eggs are held by the suction. In particular embodiments, the method comprises lifting the eggs out of their respective trays before injecting them, although it will be understood that the invention is not limited to injection which takes place while the eggs are lifted. Furthermore, the method further comprises transferring the lifted and injected eggs from a setting tray to a hatching tray using suction to engage and hold the eggs while they are being lifted and transferred.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A device for simultaneously injecting a plurality of eggs of varying sizes with fluid substances, said device comprising:
    suction means for simultaneously engaging and lifting a plurality of individual eggs from their respective upwardly facing portions; and
    injection means cooperating with said suction means for injecting the eggs while the eggs are engaged by said suction means.

2. A device according to claim 1 wherein said injection means includes a plurality of needles having delivery ends for supplying fluid substances therefrom; and
    means adjacent each of said needles for forming an opening in an upwardly facing portion of the egg while the upwardly facing portion is engaged by said suction means.

3. A device according to claim 2 wherein said injection means also includes means for moving said delivery ends of said needles a predetermined distance from a retracted position through the openings in the eggs to an extended delivery position at which the delivery ends of said needles are at a consistent location within each individual egg regardless of the size of the egg.

4. A device according to claim 1 wherein said suction means includes:
    a plurality of flexible cups each of which is adapted for being received in seated sealing relation against portions of the shell of an egg;

a tube in communication with each of said flexible cups; and means in communication with each of said tubes for providing suction through said tube and to said cup, so that the suction seats the shell of an egg against said cup.

5. A device according to claim 4 wherein said injection means includes:

a plurality of injection needles, each of which has the delivery end thereof disposed within one of said tubes, and movable between a retracted inoperative position and an extended injecting position with respect to said tube, whereby the relationship defined by the seated position of the shell of an egg against said cup and the injecting position of said needle reproducibly positions the needle at a predetermined location within an egg, regardless of the size of the egg.

6. A device for simultaneously injecting a plurality of eggs of varying sizes with fluid substances so that the substances are placed at a consistent location within each egg regardless of the size of each egg, said device comprising:

a plurality of flexible cups adapted for being received in seated sealing relation against upwardly facing shell portions of an egg;

a plurality of tubes, each of which is in communication with upper portions of one of said flexible cups;

means in communication with each of said tubes for providing suction through each tube and to each cup, so that the suction seats the upwardly facing shell portions of an egg against each of said cups and lifts each of the eggs until the respective top portions of the upwardly facing shell portions of the eggs are at one defined horizontal position with respect to one another, regardless of the size of the individual eggs;

a plurality of injection needles having delivery ends for supplying fluid substances therefrom, the delivery ends of each of said needles being disposed within one of said tubes and movable between a retracted inoperative position and an extended injecting position with respect to said tube at which each of said delivery ends of said needles is at a consistent location within each individual egg regardless of the size of the egg; and a plurality of punches, each of which is positioned within one of said tubes and surrounds one of said needles, for puncturing the upwardly facing shell portions of an egg positioned by said suction means, so that each of said injection needles can move through the respective punctured portion of an egg to said extended injecting position and so that the relationship defined by the seated position of the shells of the eggs against said cups and by the injecting position of said needles permits delivery of fluid substances to a defined desired position within each individual egg, regardless of the size of the egg.

7. A device according to claim 6 wherein said delivery ends of said injection needles have beveled tips.

8. A device according to claim 6 wherein said punches have blunt ends.

9. A device for automatically injecting eggs with fluid substances while concurrently transferring the eggs from an incubation setting tray to a hatching tray, said device comprising:

egg transfer means mounted for movement between a first location adapted to receive an incubation setting tray and a second location adapated to receive a hatching tray and operable for simultaneously engaging a plurality of individual eggs in the incubation setting tray and for removing the eggs from the setting tray and carrying the eggs to the hatching tray; and egg injection means associated with said egg transfer means and operable for injecting eggs removed from the setting tray with fluid substances, whereby incubated eggs in a setting tray may be automatically removed from the setting tray, injected with a fluid substance, and then placed in a hatching tray, all without manual operation.

10. A device according to claim 9 wherein said transfer means comprises suction means for engaging the upwardly facing end portions of a plurality of individual eggs and for holding the eggs by suction while removing eggs from the setting tray and carrying the eggs to the hatching tray.

11. A device for automatically injecting eggs with fluid substances while concurrently transferring the eggs from an incubation setting tray to a hatching tray, said device comprising:

a first rack for receiving an incubation setting tray containing eggs;

a second rack spaced apart from said first rack for receiving a hatching tray thereon;

suction means mounted for movement between said first rack and said second rack and operable for simultaneously engaging the upwardly facing end portions of a plurality of individual eggs at said first rack and for holding the eggs by suction while carrying the eggs to said second rack; and egg injection means associated with said suction means for injecting eggs with fluid substances while they are being engaged by said suction means whereby incubated eggs in a setting tray may be automatically removed from the setting tray, injected with a fluid substance, and then placed in a hatching tray, all without manual operation.

12. A device according to claim 11 wherein said egg injection means includes a plurality of injection needles mounted for movement between a retracted inoperative position and an extending injecting position.

13. A device according to claim 11 wherein said suction means further comprise:

a plurality of flexible cups adapted for being received in seated sealing relation against portions of the shell of an egg;

a plurality of tubes, each of which is in communication with one of said flexible cups; and means in communication with said tubes for providing suction through said tubes and to said cups, so that the suction seats the shell of an egg against said cup.

14. A device according to claim 13 wherein said egg injection means further comprises:

a plurality of injection needles, each of which has its delivery end disposed within one of said tubes and movable between a retracted inoperative and an extended injecting position with respect to said tube, whereby the relationship defined by the seated position of the shell of an egg against said cup and the extended injecting position of said needle reproducibly positions the needle at a predetermined location within each egg, regardless of the size of the egg.

15. A device for positioning an egg and an injection needle in a fixed relationship with respect to one another in order to provide accurate and precise injection and delivery of fluid substances to a desired location within eggs of various sizes, said device comprising:

a flexible cup, compressible between respective extended and compressed positions, for being received in seated sealing relation against portions of the shell of an egg;

means in communication with said cup for providing suction to said cup, which draft seats the shell of an egg against said cup; and an injection needle having the delivery end thereof disposed adjacent said cup and movable between a retracted inoperative position and an extended injecting position with respect to said cup, whereby the relationship defined by the compressed position of said cup and the fixed injecting position of said needle reproducibly positions the needle at a predetermined location with an egg, regardless of the size of the egg.

16. A device according to claim 15 wherein said means for providing a suction draft to said flexible cup further comprises a tube in communication with upper portions of said flexible cup.

17. A device according to claim 16 wherein said movable injection needle has its delivery end disposed within said tube.

18. A device for simultaneously injecting a plurality of eggs of varying sizes with fluid substances, said device comprising:

means for simultaneously engaging and lifting a plurality of individual eggs which are at rest on a surface from their respective upwardly facing portions and until the eggs are no longer in contact with the surface; and injection means cooperating with said lifting means for injecting the eggs while the eggs are engaged by the lifting means and out of contact with the surface.

19. A device for simultaneously injecting a plurality of individual eggs with fluid substances, said device comprising:

a plurality of cylindrical tubular punches for puncturing the shell of an egg, each of which punches is movable between an inoperative retracted position and an operative puncturing position which forms an opening in the shell of an egg; and a plurality of injection needles, each of which is positioned within one of said cylindrical tubular punches and movable in response to the movement of said punch from a retracted position to an injecting position within an egg so that the responsive movement of said needle follows the shell-opening movement of said punch whereby said needle can deliver fluid substances to a position within an egg by passing through the opening formed by said punch without engaging the shell portion of the egg.

20. A method for simultaneously injecting a plurality of eggs of varying sizes with fluid substances and comprising:

applying suction to the upwardly facing shell portions of a plurality of individual eggs to engage and hold the eggs;

lifting the eggs while the eggs are held by the suction; and injecting the eggs with a fluid substance while the eggs are held by the suction.

21. A method according to claim 20 wherein the step of lifting the eggs comprises lifting the individual eggs until the respective top portions thereof are at one defined horizontal position with respect to one another, regardless of the size of the individual eggs.

22. A method according to claim 21 wherein the step of injecting the eggs comprises moving an injection needle to a defined injecting position with respect to the defined horizontal position of the top portions of the eggs held by the suction, to thereby place the injection needle at a consistent position within each egg injected, regardless of the size of the egg.

23. A method of automatically injecting eggs with fluid substances while concurrently transferring the eggs from an incubation setting tray to a hatching tray, said method comprising:

engaging a plurality of individual eggs in a setting tray;

removing the engaged eggs from the setting tray;

injecting the eggs with fluid substances; and transferring the eggs into a hatching tray.

24. A method of automatically injecting eggs with fluid substances while concurrently transferring the eggs from an incubation setting tray to a hatching tray, said method comprising:

applying suction to engage and hold the upwardly facing shell portions of a plurality of individual eggs in a setting tray;

lifting eggs held by the suction out of the setting tray;

injecting the eggs with fluid substances while the eggs are held by the suction;

moving the eggs into a hatching tray; and releasing the suction from the injected eggs in the hatching tray.

25. A method of positioning an egg and an injection needle in a fixed relationship with respect to one another in order to provide accurate and precise injection and delivery of fluid substances to a desired location within eggs of various sizes, said method comprising:

placing a flexible cup in seating sealing relation against portions of the shell of an egg;

providing suction to the cup to seat the shell of an egg against the cup; and moving an injection needle, portions of which are movable between a retracted inoperative position and an extended injecting position with respect to the cup, to its extended injecting position so that the relationship defined by the seated position of the cup against the egg and the fixed injecting position of the needle reproducibly positions the needle at a predetermined location within the egg, regardless of the size of the egg.

26. A method according to claim 25 further comprising perforating the shell of the egg before moving the injection needle from its retracted to its extended position.

27. A method for injecting a plurality of eggs with fluid substances and comprising:

engaging a plurality of eggs which are at rest on a surface from their respective upwardly facing portions;

lifting the engaged eggs until the eggs are no longer in contact with the surface; and injecting the eggs with a fluid substance while the engaged and lifted eggs are out of contact with the surface.

* * * * *